United States Patent
Itoga

(10) Patent No.: US 10,601,057 B2
(45) Date of Patent: Mar. 24, 2020

(54) FUEL CELL SYSTEM AND VEHICLE

(71) Applicant: TOYOTA JIDOSHA KABUSHIKI KAISHA, Toyota-shi, Aichi-ken (JP)

(72) Inventor: Michitaro Itoga, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 81 days.

(21) Appl. No.: 15/782,231

(22) Filed: Oct. 12, 2017

(65) Prior Publication Data
US 2018/0123148 A1    May 3, 2018

(30) Foreign Application Priority Data

Oct. 27, 2016  (JP) ................. 2016-210202

(51) Int. Cl.
| | |
|---|---|
| H01M 8/04 | (2016.01) |
| H01M 8/2457 | (2016.01) |
| B60L 50/72 | (2019.01) |
| B60L 3/00 | (2019.01) |
| H01M 8/04082 | (2016.01) |

(Continued)

(52) U.S. Cl.
CPC ............ *H01M 8/04* (2013.01); *B60L 3/0015* (2013.01); *B60L 3/0053* (2013.01); *B60L 50/72* (2019.02); *H01M 8/04097* (2013.01); *H01M 8/04164* (2013.01); *H01M 8/04201* (2013.01); *H01M 8/22* (2013.01); *H01M 8/242* (2013.01); *H01M 8/2457* (2016.02); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2015/0027796 A1 | 1/2015 | Naito et al. | |
| 2015/0244006 A1 | 8/2015 | Yoshitomi et al. | |
| 2015/0318562 A1 | 11/2015 | Hausmann et al. | |

FOREIGN PATENT DOCUMENTS

| | | |
|---|---|---|
| JP | 2013-145711 A | 7/2013 |
| JP | 2014-123457 | 7/2014 |

(Continued)

OTHER PUBLICATIONS

Rei et al JP 2013-145711 English translation obtained via Google Patents on Apr. 17, 2019 (Year: 2013).*

*Primary Examiner* — Sarah A. Slifka
(74) *Attorney, Agent, or Firm* — Finnegan, Henderson, Farabow, Garrett & Dunner, LLP

(57) ABSTRACT

The fuel cell system includes: a fuel cell stack, a hydrogen inlet, a hydrogen outlet, an air inlet, and an air outlet; a hydrogen supply flow path; a hydrogen circulation flow path for circulating gas from the hydrogen outlet to a merging point of the hydrogen supply flow path; a hydrogen pump on the hydrogen circulation flow path; and a gas-liquid separator on the hydrogen circulation flow path. The hydrogen inlet is positioned above the hydrogen outlet, the air inlet is positioned on an upper side of the air outlet, and a direction of connection between the hydrogen inlet and the hydrogen outlet and a direction of connection between the air inlet and the air outlet intersect each other. An upper end of the hydrogen pump is positioned below the stack. The gas-liquid separator is provided at the lowest site of the hydrogen circulation flow path.

7 Claims, 6 Drawing Sheets

(51) Int. Cl.
*H01M 8/04119* (2016.01)
*H01M 8/04089* (2016.01)
*H01M 8/242* (2016.01)
*H01M 8/22* (2006.01)

(56) References Cited

FOREIGN PATENT DOCUMENTS

JP  2015-159005  9/2015
WO  WO2013/118602 A1  8/2013

* cited by examiner

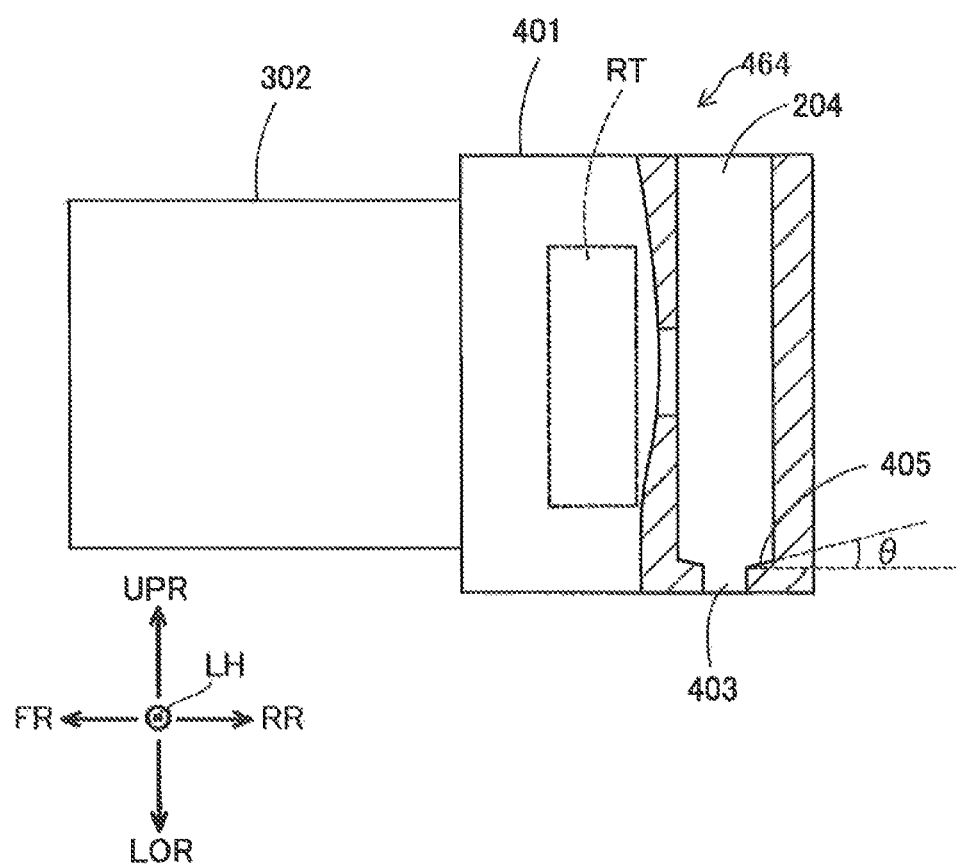

FUEL CELL SYSTEM AND VEHICLE

CROSS REFERENCE TO RELATED APPLICATIONS

The present application claims the priority based on Japanese Patent Application No. 2016-210202 filed on Oct. 27, 2016, the disclosure of which is hereby incorporated by reference in its entirety.

BACKGROUND

Field

The present disclosure relates to a fuel cell system and a vehicle.

Related Art

A fuel cell system including a fuel cell stack is equipped with a hydrogen gas circulation system for circulating hydrogen gas to the fuel cell stack, and an oxidizing gas supply system for supplying oxidizing gas (e.g., air) to the fuel cell stack. The hydrogen gas circulation system includes a hydrogen pump and a gas-liquid separator which are relatively large-sized. Therefore, in order to reduce the size of the fuel cell system, the following fuel cell system is proposed in JP 2014-123457 A. In this fuel cell system, the hydrogen pump and the gas-liquid separator are disposed at such positions that visible outlines of the hydrogen pump and the gas-liquid separator are contained within a visible outline of an end plate of the fuel cell stack, as viewed in a stacking direction of the fuel cell stack.

With the fuel cell system described in JP 2014-123457 A, unfortunately, there has been a possibility that when a shock in the stacking direction of the fuel cell system is applied to the hydrogen pump or the gas-liquid separator, the hydrogen pump or the gas-liquid separator and the fuel cell system may collide with each other, causing the fuel cell stack to be damaged. In order to avoid such problems, it may be conceived to place the hydrogen pump or the gas-liquid separator away from the fuel cell stack. However, in such an aspect, drainage efficiency in the hydrogen gas circulation system may become insufficient. Accordingly, there has been desired a technique that makes it possible to satisfy, at the same time, prevention of damage to the fuel cell stack upon a shock applied to the hydrogen pump or the gas-liquid separator as well as increase in the drainage efficiency of the hydrogen gas circulation system inside the fuel cell system.

The present disclosure, having been accomplished to address at least part of the above-described problems, may be implemented in the following aspects.

SUMMARY

In one aspect of the present disclosure, there is provided a fuel cell system. The fuel cell system includes: a fuel cell stack having a stacked body in which a plurality of fuel cells are stacked in a stacking direction, a hydrogen gas inlet, a hydrogen gas outlet, an air inlet, and an air outlet; a hydrogen gas supply flow path configured to allow gas to circulate to the hydrogen gas inlet from a hydrogen gas supply unit which serves for supplying hydrogen gas; a hydrogen gas circulation flow path configured to allow gas to circulate from the hydrogen gas outlet to a merging point of the hydrogen gas supply flow path; a hydrogen circulation pump provided midway on the hydrogen gas circulation flow path to pressurize and feed hydrogen off-gas, which is discharged from the hydrogen gas outlet, toward the hydrogen gas supply flow path; and a gas-liquid separator provided midway on the hydrogen gas circulation flow path to separate water content from the hydrogen off-gas. The fuel cell stack has a configuration that as viewed along the stacking direction, the hydrogen gas inlet is positioned above the hydrogen gas outlet, and a direction of connection between the hydrogen gas inlet and the hydrogen gas outlet and a direction of connection between the air inlet and the air outlet intersect each other. An upper end of the hydrogen circulation pump is positioned on a lower side of a lower end of the fuel cell stack. A position where the gas-liquid separator is provided on the hydrogen gas circulation flow path is the lowest site of the hydrogen gas circulation flow path.

BRIEF DESCRIPTION OF DRAWINGS

FIG. 6 is an explanatory view showing Modification 4.

DETAILED DESCRIPTION

Figure 1:
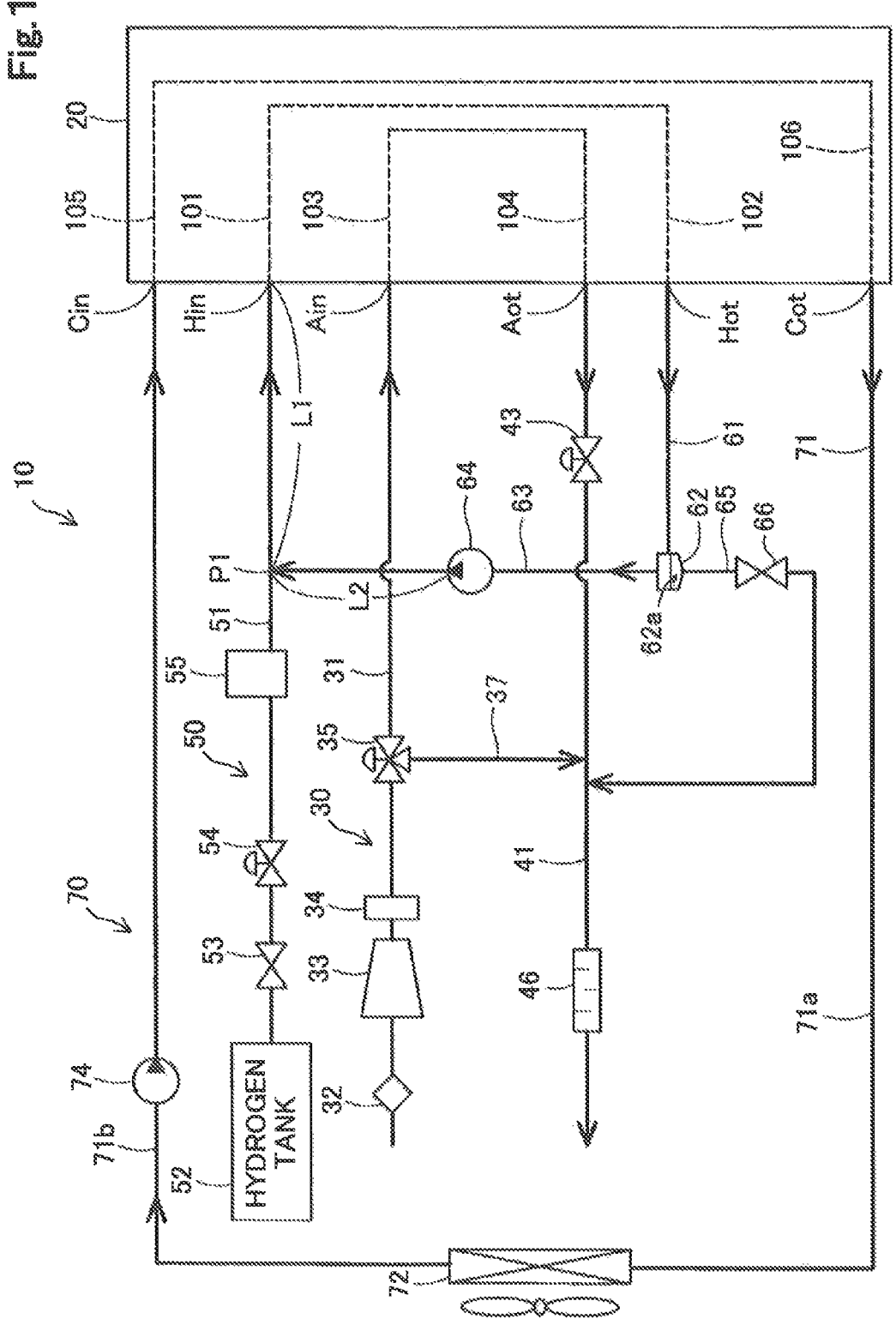
FIG. 1 is an explanatory view showing a flow path configuration of a fuel cell system according to an embodiment of the present disclosure.

A. General Configuration:

FIG. 1 is an explanatory view showing a flow path configuration of a fuel cell system 10 according to an embodiment of the present disclosure. The fuel cell system 10 is mounted on a vehicle to output electric power to be used as driving force in response to a request from a driver. The vehicle is, for example, a four-wheel car. The fuel cell system 10 includes a fuel cell stack 20, an air supply/discharge portion 30, a hydrogen gas supply/discharge portion 50, and a refrigerant circulation portion 70.

The fuel cell stack 20 is a unit for generating electric power by electrochemical reactions of fuel gas (hydrogen gas in this embodiment) and oxidizing gas (air in this embodiment). The fuel cell stack 20 is formed by stacking a plurality of fuel cells in layers. Each fuel cell is a power-generating element enabled to generate power even by itself. Each fuel cell includes an MEA (Membrane Electrode Assembly), which is a power generator having electrodes (cathode and anode) on both sides of an electrolyte membrane, and separators which are placed on both sides of the MEA. The electrolyte membrane is formed of a solid polymer thin film which exhibits successful proton conductivity in its wet state with water content internally contained. Although various types of fuel cell stacks may be adopted as the fuel cell stack 20, a solid polymer-type fuel cell stack is used in this embodiment.

The air supply/discharge portion 30 has function of supplying air as the oxidizing gas to the fuel cell stack 20, and a function of discharging drain water and cathode off-gas, which are discharged from the cathode side of the fuel cell stack 20, to outside of the fuel cell system 10.

The air supply/discharge portion 30 includes, on the upstream side of the fuel cell stack 20, air supply piping 31, an air cleaner 32, an air compressor 33, an intercooler 34 for lowering intake air temperatures increased by supercharging, a flow dividing valve 35, and air flow dividing piping 37.

The air supply piping 31 is piping connected to a cathode-side inlet Ain of the fuel cell stack 20. On the air supply piping 31, as viewed downstream from the intake port side for intake of outside air, provided are the air cleaner 32, the air compressor 33, the intercooler 34, and the flow dividing valve 35 in this order.

The air cleaner 32 is provided on the intake port side of the air supply piping 31 to clean intake air. The air compressor 33 takes in air and supplies compressed air to the cathode side of the fuel cell stack. The intercooler 34 lowers intake air temperatures increased by the air compressor 33.

The flow dividing valve 35 is provided between the intercooler 34 and the fuel cell stack 20 to divide the flow of air, which has been compressed by the air compressor 33 and cooled by the intercooler 34, into a flow toward the side of the fuel cell stack 20 and a flow toward the side of cathode of piping 41. The air distributed toward the cathode of piping 41 side is made to flow via the air flow dividing piping 37. The cathode off-gas piping 41 will be detailed later.

The air supply/discharge portion 30 includes, on the downstream side of the fuel cell stack 20, the cathode off-gas piping 41, a pressure regulating valve 43, and a muffler 46. The cathode off-gas piping 41 is piping connected to a cathode-side outlet Aot of the fuel cell stack 20. The cathode off-gas piping 41 is enabled to discharge generated water and cathode off-gas to outside of the fuel cell system 10.

The pressure regulating valve 43 is provided in the cathode off-gas piping 41 to regulate a pressure of the cathode off-gas (cathode-side back pressure of the fuel cell stack 20). A port that is a flow-divided destination of the air flow dividing piping 37 is connected between the pressure regulating valve 43 and the muffler 46 on the cathode of piping 41.

The hydrogen gas supply/discharge portion 50 has a function of supplying hydrogen gas to the fuel cell stack 20, a function of discharging anode off-gas (hydrogen off-gas), which is discharged from the fuel cell stack 20, to outside of the fuel cell system 10, and a function of circulating the anode off-gas inside the fuel cell system 10.

The hydrogen gas supply/discharge portion 50 includes hydrogen gas supply piping 51 and a hydrogen tank 52 on the upstream side of the fuel cell stack 20. The hydrogen tank is filled with high-pressure hydrogen which is to be supplied to the fuel cell stack 20. The hydrogen tank 52 is connected to an anode-side inlet Hin of the fuel cell stack 20 via the hydrogen gas supply piping 51.

Further provided on the hydrogen gas supply piping 51 are an opening/closing valve 53, a regulator 54, and a hydrogen supply unit 55 in this order from the upstream side (hydrogen tank 52 side). The opening/closing valve 53 regulates inflow of hydrogen from the hydrogen tank 52 to the hydrogen supply unit 55. The regulator 54 is a pressure regulating valve for regulating a pressure of hydrogen on the upstream side of the hydrogen supply unit 55. The hydrogen supply unit 55 is formed of, for example, an injector which is an electromagnetically driven opening/closing valve. A range from the hydrogen supply unit 55 to the anode-side inlet Hin on the hydrogen gas supply piping 51 corresponds to 'hydrogen gas supply flow path' in one aspect of the disclosure.

The hydrogen gas supply/discharge portion 50 includes, on the downstream side of the fuel cell stack 20, anode off-gas piping 61, a gas-liquid separator hydrogen gas circulation piping 63, a hydrogen circulation pump 64, anode drain piping 65, and a drain valve 66.

The anode off-gas piping 61 is piping for connecting an anode-side outlet Hot of the fuel cell stack 20 and the gas-liquid separator 62 to each other.

The gas-liquid separator 62 is connected to the hydrogen gas circulation piping 63 and the anode drain piping 65. Anode off-gas having flowed into the gas-liquid separator 62 via the anode off-gas piping 61 is separated into gaseous components and liquid components (liquid water in this case) by the gas-liquid separator 62. The gaseous components of the anode off-gas are led to the hydrogen gas circulation piping 63 within the gas-liquid separator 62, while the liquid components (liquid water in this case) are once reserved in a water reservoir 62a and are then led from the water reservoir 62a to the anode drain piping 65.

The hydrogen gas circulation piping 63 is connected to a point P1 (hereinafter, referred to as 'merging point P1') on the downstream side of the hydrogen supply unit 55 in the hydrogen gas supply piping 51. A hydrogen circulation pump 64 is provided in the hydrogen gas circulation piping 63. The hydrogen circulation pump 64 functions as a circulation pump for feeding out hydrogen. contained in the gaseous components separated in the gas-liquid separator 62 to the hydrogen gas supply piping 51. The anode off-gas piping 61 and the hydrogen gas circulation piping 63 constitute a 'hydrogen gas circulation flow path' in one aspect of the disclosure.

A drain valve 66 is provided in the anode drain piping 65. The drain valve 66, which is normally closed, is opened at a preset drainage timing or a discharge timing of inert gas in the anode off-gas. A downstream end of the anode drain piping 65 is merged with the cathode off-gas piping 41 so that anode-side drain water and the anode off-gas may be discharged so as to be mixed with the cathode-side drain water and the cathode off-gas.

The refrigerant circulation portion 70 includes refrigerant piping 71, a radiator 72, and a refrigerant circulation pump 74. The refrigerant piping 71, which is piping for circulating a refrigerant to cool the fuel cell stack 20, is composed of upstream-side piping 71a and downstream-side piping 71b. The upstream-side piping 71a connects an outlet Cot of a refrigerant flow path in the fuel cell stack 20 and an inlet of the radiator 72 to each other. The downstream-side piping 71b connects an inlet Cin of the refrigerant flow path in the fuel cell stack 20 and an outlet of the radiator 72 to each other.

The radiator 72 has a fan for intake of outside air, and exchanges heat between the refrigerant of the refrigerant piping 71 and outside air to cool the refrigerant. The refrigerant circulation pump 74 is provided in the downstream-side piping 71b. The refrigerant flows in the refrigerant piping 71 by driving force of the refrigerant circulation pump 74.

The above-described constituent members of the air supply/discharge portion 30, the hydrogen gas supply/discharge portion 50 and the refrigerant circulation portion 70 are controlled by a control section (not shown in FIG. 1 for easier understanding of techniques) implemented by a microcomputer. As a result, such control processes are fulfilled as (i) supply control of hydrogen gas and air to the fuel cell stack 20, (ii) drainage control from the fuel cell stack 20, and (iii) cooling control of exhaust heat generated in the fuel cell stack 20.

Main parts of the fuel cell stack 20 configured as described above, i.e., the fuel cell stack 20 and auxiliary parts such as the hydrogen supply unit 55, the gas-liquid separator 62, and the hydrogen circulation pump 64 are provided within the vehicle's engine room. The term 'engine room' refers to a space in which the internal combustion engine is mounted in an automobile equipped with a conventional internal combustion engine. A similar space is provided in a vehicle on which the fuel cell system 10 is to be mounted. The space is referred to as 'engine room' for the sake of convenience. The inventor of this application has devised the following layout by discussing the layout of the individual parts in various ways to accommodate the fuel cell stack 20 and the auxiliary parts in the engine room.

Figure 2:
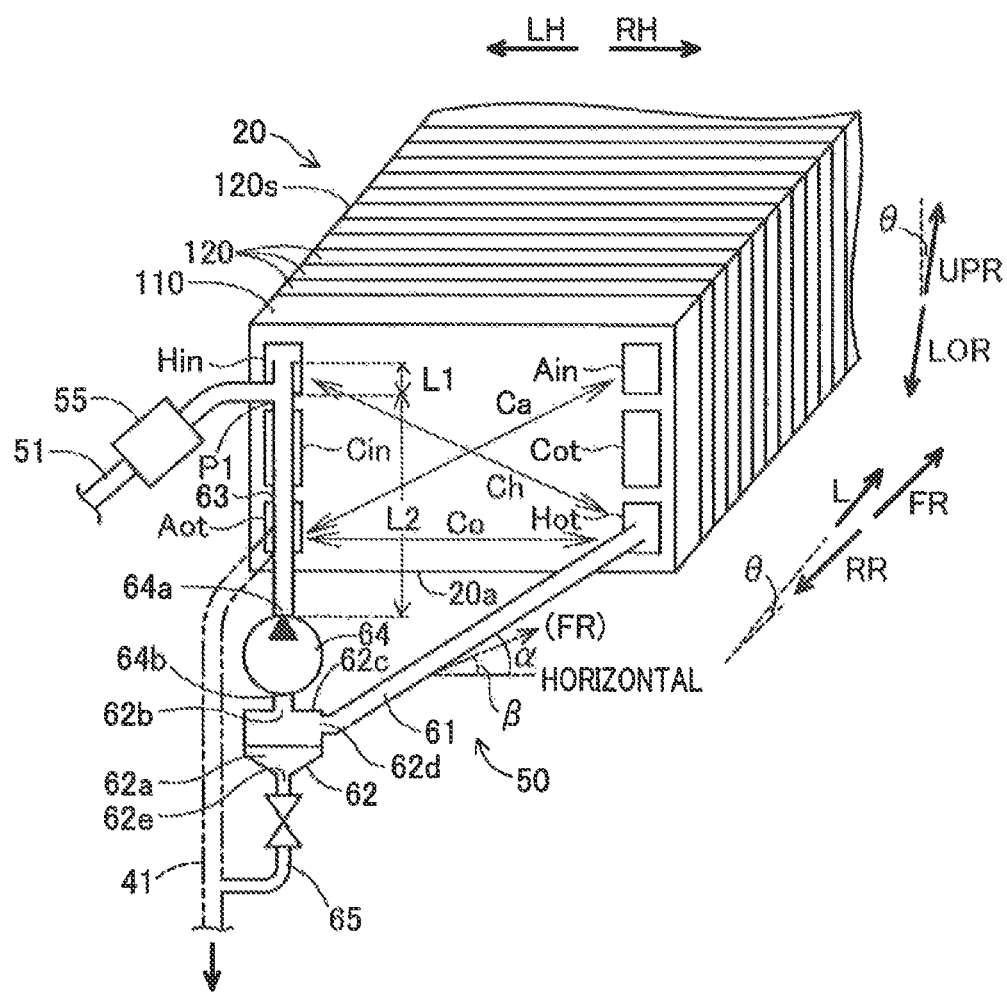
FIG. 2 is a perspective view showing a layout of main parts of a hydrogen gas supply/discharge portion relative to the fuel cell stack.
Figure 3:
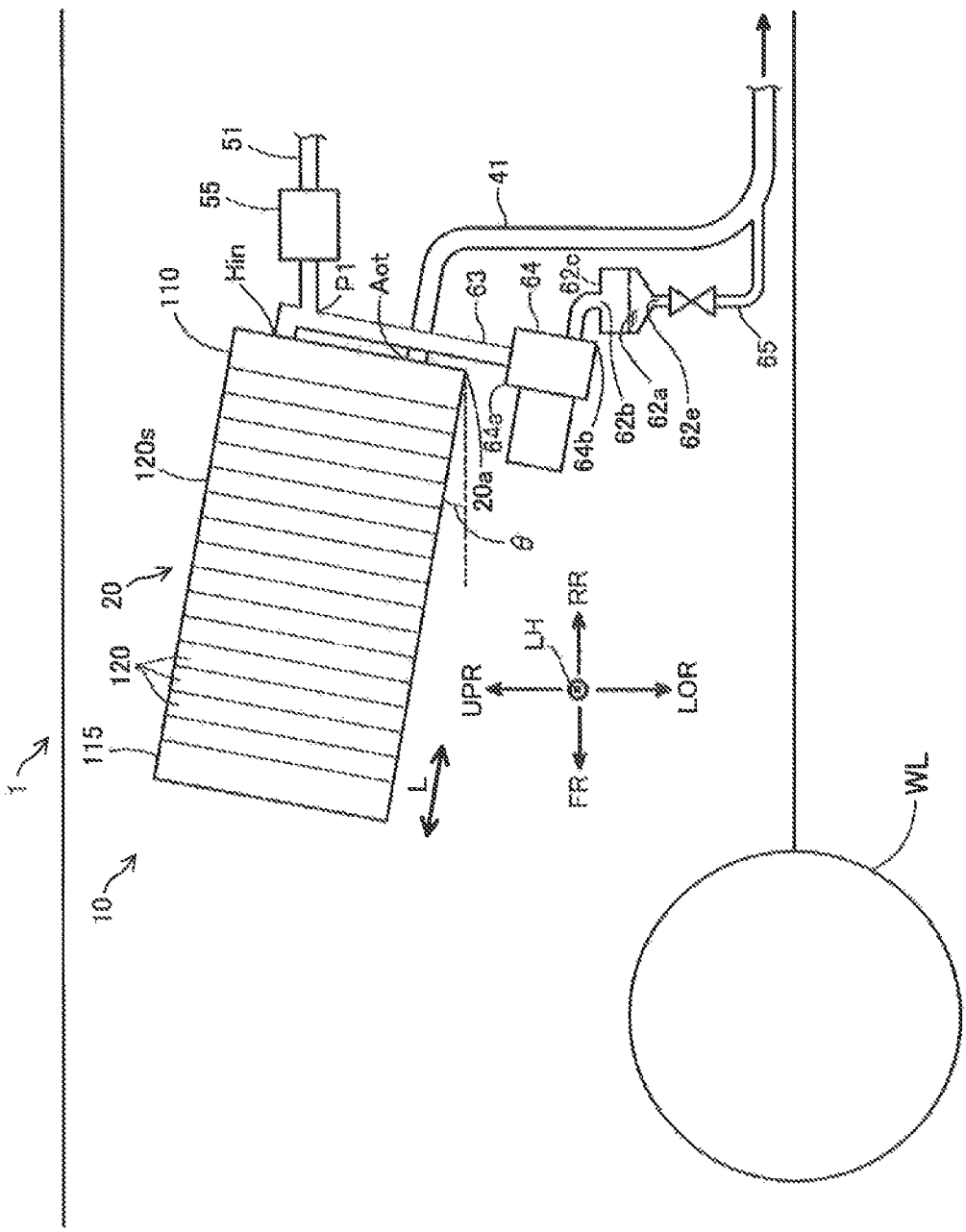
FIG. 3 a side view showing a layout of main parts of the hydrogen gas supply/discharge portion relative to the fuel cell stack in a vehicle 1.

B. Layout:

FIG. 2 is a view showing a layout of main parts of the hydrogen gas supply/discharge portion 50 relative to the fuel cell stack 20. FIG. 3 is a view showing a layout of main parts of the hydrogen gas supply discharge portion 50 relative to the fuel cell stack 20 in a vehicle 1 equipped with the fuel cell system 10 and wheels WL. FIG. 2 is a perspective view, and FIG. 3 is a side view. As shown in FIGS. 2 and 3, the fuel cell stack 20 is placed against the vehicle such that a stacking direction L of the fuel cells 120 (hereinafter, referred to simply as 'stacking direction') is inclined by a specified angle θ relative to a back-and-forth direction. (front direction FR and rear direction RR) of the vehicle. As a result, the front direction FR-side part of the fuel cells 120 is positioned above the rear direction RR-side part of the fuel cells 120.

As shown in FIG. 2, the fuel cell stack 20 has a rectangular shape as viewed along the stacking direction L. The fuel cell stack 20 is mounted on the vehicle such that a direction of one side of this rectangular shape coincides with the left/right direction (left direction LH and right direction RH) of the vehicle (see FIG. 2). Characters 'UPR' and 'LOR' in the figure denote upper direction and lower direction of the vehicle, respectively. The upper/lower directions UPR, LOR coincide with the vertical direction when the vehicle is parked on a horizontal plane. The upper/lower directions UPR, LOR, the left/right directions LH, RH, and the front/rear directions FR, RR are perpendicular to one another.

At one end of a stacking direction of the fuel cell stack 20 (end portion in the rear direction RR), a first end plate 110 is provided, while a second end plate 115 is provided at the other end of the stacking direction of the fuel cell stack 20 (end portion in the front direction FR) (see FIG. 3). A plurality of fuel cells 120 are stacked in layers between the first end plate 110 and the second end plate 115. That is, the fuel cell stack 20 has a structure that a stacked body 120s of plural fuel cells 120 stacked in the stacking direction is held between the first end plate 110 and the second end plate 115.

Provided in the first end plate 110 are the above-described anode-side inlet Hin, anode-side outlet Hot, cathode-side inlet Ain, and cathode-side outlet Aot of the fuel cell stack 20 as well as refrigerant flow path inlet Cin and refrigerant flow path outlet Cot. As shown in FIG. 2, in this embodiment, the following configurational elements are disposed at individual positions on the surface of the first end plate 110, as viewed along the stacking direction L. That is, the anode-side inlet Hin is provided at a upper left corner of the surface of the first end plate 110. The anode-side outlet Hot is provided at a lower right corner of the surface of the first end plate 110. The cathode-side inlet Ain is provided at a upper right corner of the surface of the first end plate 110. The cathode-side outlet Aot is provided at a lower left corner of the surface of the first end plate 110. The refrigerant flow path inlet Cin is provided at the center of an up/down direction in a left-side part of the surface of the first end plate 110. The refrigerant flow path outlet Cot is provided at the center of an up/down direction in a right-side part of the surface of the first end plate 110. A direction Ch of a virtual line interconnecting the anode-side inlet Hin and the anode-side outlet Hot and a direction Ca of another virtual line interconnecting the cathode-side inlet Ain and the cathode-side outlet Aot intersect each other. In this case, the term 'left' refers to left direction LH. The term 'right' refers to right direction RH. The term 'upper' refers to upper direction UPR. The term 'lower' refers to lower direction LOR.

In this embodiment, the refrigerant flow path inlet Cin is provided at the center of the up/down direction in the left side of the surface of the first end plate 110, while the refrigerant flow path outlet Cot is provided at the center of the up/down direction in the right side of the surface of the first end plate 110. However, instead of this, the refrigerant flow path inlet Cin may be provided at the center of the up/down direction in the right side of the surface of the first end plate 110, while the refrigerant flow path outlet Cot may he provided at the center of the up/down direction in the left side of the surface of the first end plate 110.

Each fuel cell 120 has a structure in which an air flow path (in-cell air flow path) is formed between the MEA and a separator on one side while a hydrogen gas flow path (in-cell hydrogen flow path) is formed between the MEA and a separator on the other side. The in-cell air flow path and the in-cell hydrogen flow path are so formed as to extend along a plane perpendicular to the stacking direction of the fuel cells 120 (see FIG. 2).

Hydrogen gas supplied through the anode-side inlet Hin is fed in the stacking direction via a hydrogen gas supply manifold 101 (see FIG. 1) so as to be distributed from the hydrogen gas supply manifold 101 to the in-cell hydrogen flow paths of the individual fuel cells 120. Hydrogen (anode off-gas) remaining after its passage through the in-cell hydrogen flow paths of the individual fuel cells 120 is collected by a hydrogen gas discharge manifold 102 (see FIG. 1), and discharged through the anode-side outlet Hot to outside of the fuel cell stack 20. Air supplied through the cathode-side inlet Ain is fed in the stacking direction via an air supply manifold 103 (see FIG. 1), and distributed from the air supply manifold 103 to the in-cell air flow paths of the individual fuel cells 120. Air (cathode off-gas) remaining after its passage through the in-cell air flow paths of the individual fuel cells 120 is collected by an air discharge manifold 104 (see FIG. 1), and discharged through the cathode-side outlet Aot to outside of the fuel cell stack 20.

As described above, the anode-side inlet Hin is provided at the upper left corner, the anode-side outlet Hot is provided at the lower right corner, the cathode-side inlet Ain is provided at the upper right corner, and the cathode-side outlet Aot is provided at the lower left corner (see FIG. 2). From this arrangement, a flow direction of hydrogen gas and a flow direction of air within the fuel cells 120 are in a mutually-opposed cross-flow relationship. Therefore, the fuel cell stack 20 is high in supply efficiency of hydrogen gas and air as well as power generation performance. Also, since the anode-side inlet Hin is provided on the upper side and the anode-side outlet Hot is provided on the lower side, the fuel cell stack 20 is high in drainage performance for discharge of water generated in the fuel cells 120.

As to a separator on which the in-cell air flow path is formed, on one side of the separator opposite to its MEA side, a refrigerant flow path (in-cell refrigerant flow path) is formed. The refrigerant supplied through the refrigerant flow path inlet Cin (see FIG. 1) is fed in the stacking direction via a refrigerant supply manifold 105 (see FIG. 1), and distributed from the refrigerant supply manifold 105 to the in-cell refrigerant flow paths of the individual fuel cells 120. The refrigerant having passed through the in-cell refrigerant flow paths of the individual fuel cells 12(3 is collected by a refrigerant discharge manifold 106 (see FIG. 1), and discharged through the refrigerant flow path outlet Cot to outside of the fuel cell stack 20.

As described before with FIG. 1, the hydrogen gas supply piping 51 is coupled to the anode-side inlet Hin, and the hydrogen gas circulation piping 53 is coupled to the predetermined merging point P1 on the hydrogen gas supply piping 51. As shown in FIGS. 2 and 3, the merging point P1 is positioned close to the first end plate 110. More specifically, a length L1 of a portion of the hydrogen gas supply piping 51 on the downstream side of the merging point P1 is shorter than a length L2 of a portion of the hydrogen gas circulation piping 63 on the downstream side of the hydrogen circulation pump 64 (see FIG. 2). Since the merging point P1 is positioned close to the first end plate 110, pressure loss in the hydrogen gas supply/discharge portion 50 as well as its blockage due to freezing can be suppressed. In addition, although the length L1 is depicted as longer than the length L2 in FIG. 1, this is due to the fact that FIG. 1 is a configurational view, and L1 is actually shorter than L2.

As shown in FIGS. 2 and 3, the hydrogen supply unit 55 is provided midway on the hydrogen gas supply piping 51. The hydrogen circulation pump 64 is provided midway on the hydrogen gas circulation piping 63. At an end portion of the hydrogen gas circulation piping 63 on the side opposite to the merging point P1 side, the gas-liquid separator 62 is coupled thereto (see also FIG. 1). More specifically, the hydrogen gas circulation piping 63 is coupled to a gas discharge port 62*b* of the gas-liquid separator 62 (see FIGS. 2 and 3).

In this embodiment, the anode-side inlet Hin, the merging point P1 of the hydrogen gas circulation piping 63 on the hydrogen gas supply piping 51, the hydrogen circulation pump 64, and the gas-liquid separator 62 are so placed as to be arrayed in the upper/lower directions UPR, LOR as viewed along the front/rear directions FR, RR of the vehicle (see FIG. 2). Moreover, a piping path from the gas-liquid separator 62 to the anode-side inlet Hin is so shaped as to extend linearly in the up/down direction as viewed along the front/rear directions FR, RR of the vehicle. More specifically, (i) a portion of the hydrogen gas circulation piping 63 on the upstream side of the hydrogen circulation pump 64, (ii) a portion of the hydrogen gas circulation piping 63 on the downstream side of the hydrogen circulation pump 64, and (iii) a portion of the hydrogen gas supply piping 51 on the downstream side of the merging point P1, are so shaped as to extend linearly in the up/down direction as viewed along the front/rear directions FR, RR of the vehicle. Also, the portion of the hydrogen gas circulation piping 63 on the downstream side of the hydrogen circulation pump 64 is placed in a shape parallel to the surface of the first end plate 110 (see FIG. 3).

The term 'placed as to be arrayed in the upper/lower directions' refers to a placement in which individual parts are placed so as to be at least partly positioned on one line in the upper/lower directions UPR, LOR. In this embodiment, individual parts are so placed that their central positions are placed on one line in the upper/lower directions UPR, LOR. However, instead of this, individual parts may be placed so as to be partly positioned on one line in the upper/lower directions UPR, LOR.

The hydrogen circulation pump 64 is positioned below a lower end 20*a* of the fuel cell stack 20 (on the lower direction LOR side relative to the lower end 20*a* of the fuel cell stack 20) in the upper/lower directions UPR, LOR (see FIG. 3). In more detail, an upper end 64*a* of the hydrogen circulation pump 64 is positioned below the lower end 20*a* of the fuel cell stack 20.

Since the gas-liquid separator 62 is positioned upstream of the hydrogen circulation pump 64, the gas-liquid separator 62 is positioned below the hydrogen circulation pump 64 (the lower direction LOR side) (see FIG. 3). More specifically, an upper end 62*c* of the gas-liquid separator 62 is positioned below a lower end 64*b* of the hydrogen circulation pump 64. In addition, instead of this configuration, the upper end 62*c* of the gas-liquid separator 62 may be positioned above the lower end 64*b* of the hydrogen circulation pump 64, i.e., part of the hydrogen circulation pump 64 and part of the gas-liquid separator 62 overlap with each other in the upper/lower directions UPR, LOR. That is, it is also allowable that a volumetric center of the gas-liquid separator 62 is positioned below a volumetric center of the hydrogen circulation pump 64 while these two members partly overlap with each other.

As described before with FIG. 1, the anode off-gas piping 61 is coupled to the anode-side outlet Hot, while the gas-liquid separator 62 is connected to an end portion of the anode off-gas piping 61 on its side opposite to the anode-side outlet Hot side. More specifically, the anode off-gas piping 61 is connected to an inflow port 62*d* of the gas-liquid separator 62.

The gas-liquid separator 62 is provided at the lowest site of the hydrogen gas circulation flow path composed of the anode off-gas piping 61 and the hydrogen gas circulation piping 63 (see also FIG. 1). More specifically, an upper end of the water reservoir 62*a* included in the gas-liquid separator 62 is positioned below any part of the anode off-gas piping 61 and the hydrogen gas circulation piping 63 (i.e., on the lower direction LOR side relative to those piping) (see FIG. 2). The upper end of the water reservoir 62*a* is positioned below the inflow port 62*d* and the gas discharge port 62*b* included in the gas-liquid separator 62 (i.e., on the lower direction LOR side of the inflow port 62*d* and the gas discharge port 62*b*) (see FIG. 2). The water reservoir 62*a*, which is a part for accumulating liquid water, is positioned on the lower direction LOR side of the inflow port 62*d* in this embodiment.

In this embodiment, the anode off-gas piping 61, which connects the anode-side outlet Hot and the inflow port 62*d* of the gas-liquid separator 62 to each other, is so shaped as to extend linearly except for both-end coupling parts with the anode-side outlet Hot and the coupling part with the inflow port 62*d* (see FIG. 2). In order that an angle α of the linear portion of the anode off-gas piping 61 relative to the horizontal direction becomes larger than a vehicle stop angle β, the position of the gas-liquid separator 62 relative to the fuel cell stack 20 is determined. The vehicle stop angle β is an angle of the vehicle relative to the horizontal direction that can generally occur upon stopping of the vehicle, its value being an experimentally predetermined value. Therefore, when the vehicle is stopped at an angle of the vehicle stop angle β or less, liquid water content contained in the anode off-gas over a range from the anode-side outlet Hot to the gas-liquid separator 62 flows toward a direction inclined from the horizontal direction to the lower direction LOR side within the anode off-gas piping 61 so as to be reserved in the gas-liquid separator 62.

The anode drain piping 65 is coupled to a liquid discharge port 62*e* of the gas-liquid separator 62 (see FIG. 3). A downstream end of the anode drain piping 65 is merged with the cathode off-gas piping 41. The cathode off-gas piping 41 is coupled to the cathode-side outlet Aot provided at the lower left corner of the surface of the first end plate 110. In addition, in FIG. 2, the pressure regulating valve 43 provided in the cathode off-gas piping 41 is omitted (see FIG. 1).

Figure 4:
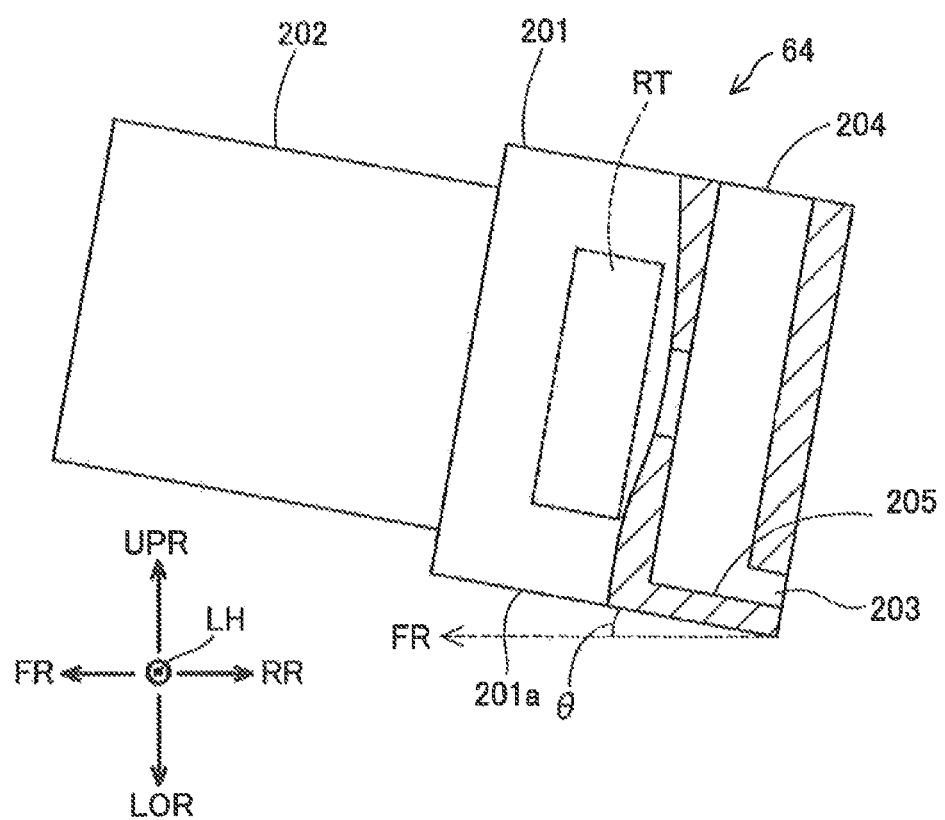
FIG. 4 is an explanatory view showing the internal structure and layout of a hydrogen circulation pump.

FIG. 4 is an explanatory view showing internal structure and layout of the hydrogen circulation pump 64. The hydrogen circulation pump 64 is a Roots-type pump having two two-lobed (peritrochoid-type) rotors RT within a pump chamber 201. A motor 202 is connected to a driving gear (not shown) provided at a shaft end of each two-lobed rotor RT, and the two two rotors RT are synchronously rotated in mutually opposite directions by the motor 202. Gas that has been let in through an intake port 203 is confined and pressurized in spaces between the pump chamber 201 and the two-lobed rotors RT, being finally discharged through an exhaust port 204. The intake port 203 is provided on the rear side of the pump chamber 201 and connected to piping on the upstream side of the hydrogen gas circulation piping 63 (see FIG. 3). The exhaust port 204 is provided on the upper side of the pump chamber 201 and connected to piping on the downstream side of the hydrogen gas circulation piping 63 (see FIG. 3). A communicating path 205 succeeding the intake port 203 extends parallel to a bottom surface 201a of the pump chamber 201.

As to the hydrogen circulation pump 64, as viewed in the front/rear directions FR, RR of the vehicle, the motor 202 is provided on the front direction FR side while the pump chamber 201 is provided on the rear direction FR side. Moreover, the hydrogen circulation pump 64 is so placed that its front direction FR-side part is inclined above the rear direction RR-side part by an angle θ relative to the front/rear directions FR, RR of the vehicle. The angle θ is equal to a specified angle θ that is the inclination angle of the fuel cell stack 20. In addition, although those angles are set equal to each other in this embodiment, they do not need to be equal necessarily and may be any angle only if it is an angle of inclination that allows the front direction FR to be directed upward.

Since the hydrogen circulation pump 64 is placed with an inclination as described above, the communicating path 205 communicating with the intake port 203 is also inclined by the angle θ relative to the front/rear directions FR, RR of the vehicle so that the front direction FR-side part is positioned upward of the rear direction RR-side part. Thus, accumulation of water within the pump chamber 201 can be suppressed.

C. Functional Effects:

According to the fuel cell system 10 of this embodiment configured as described above, since both the hydrogen circulation pump 64 and the gas-liquid separator 62 are positioned below the lower side of the lower end 20a of the fuel cell stack 20, i.e. on the lower direction LOR side (see FIG. 3), there can be suppressed possibilities of collisions of the hydrogen circulation pump 64 and the gas-liquid separator 62 with the fuel cell stack 20 when a shock is applied to the hydrogen circulation pump 64 or the gas-liquid separator 62 in the front/rear directions FR, RR of the vehicle. Also, since the gas-liquid separator 62 is provided at the lowest site of the hydrogen gas circulation flow path composed of the anode off-gas piping 61 and the hydrogen gas circulation piping 63 (see FIG. 2), liquid water content contained in the anode off-gas discharged through the anode-side outlet Hot of the fuel cell stack 20 flows down to the gas-liquid separator 62 and does not accumulate in the hydrogen gas circulation flow path. Therefore, according to the fuel cell system 10 of this embodiment, there can be prevented damage to the fuel cell stack 20 upon shocks applied to the hydrogen circulation pump 64 or the gas-liquid separator 62, and moreover, drainage efficiency in the hydrogen gas circulation flow path can be enhanced.

According to the fuel cell system 10 of this embodiment, the anode-side inlet Hin, the merging point P1, the hydrogen circulation pump 64, and the gas-liquid separator 62 are placed so as to be arrayed in the upper/lower directions UPR, LOR, as viewed along the front/rear directions FR, RR of the vehicle (see FIG. 2). Therefore, since water sticking to piping between the hydrogen circulation pump 64 and the gas-liquid separator in the hydrogen gas circulation piping 63 falls vertically downward due to gravity, there can be suppressed blockage of the hydrogen gas circulation flow path due to water remaining upon stopping of the fuel cell system 10.

According to the fuel cell system 10 of this embodiment, as viewed in a direction Co of a virtual line interconnecting the cathode-side outlet Aot and the anode-side outlet Hot, that is parallel to the left/right directions LH, RH, the hydrogen circulation pump 64 and the gas-liquid separator 62 are placed each on the left direction LH side, i.e., on one side closer to the cathode-side outlet Aot than to the anode-side outlet Hot (see FIG. 2). Therefore, the length of the anode drain piping 65 that connects the liquid discharge port 62e of the gas-liquid separator 62 and the cathode off-gas piping 41 to each other can be shortened, so that the freezing of drain water in the anode drain piping 65 can be suppressed. In addition, although the piping that connects the anode-side outlet Hot and the inflow port 62d of the gas-liquid separator 62 to each other is lengthened, generated water from the fuel cell stack 20 serves to increase temperature, so that the freezing can be suppressed.

D. Modifications:

D1. Modification 1:

In the foregoing embodiment, in the fuel cell stack 20, as the first end plate 110 is viewed along the stacking direction L, provided are the anode-side inlet Hin at the upper left corner, the anode-side outlet Hot at the lower right corner, the cathode-side inlet Ain at the upper right corner of the surface of the first end plate 110, and the cathode-side outlet Aot at the lower left corner, respectively (see FIG. 2). In contrast to this, as a modification of the foregoing embodiment, with left and right replaced with each other, there may be provided the cathode-side inlet Ain at the upper left corner of the surface of the first end plate 110, the cathode-side outlet Aot at the lower right corner, the anode-side inlet Hin at the upper right corner, and the anode-side outlet Hot at the lower left corner, respectively. In this case, as viewed along the front/rear directions FR, RR of the vehicle, the anode-side inlet Hin provided at the upper right corner, the merging point P1, the hydrogen circulation pump 64, and the gas-liquid separator 62 are placed so as to be arrayed in the upper/lower directions UPR, LOR. Even with the configuration of such Modification 1, as in the foregoing embodiment, damage to the fuel cell stack 20 upon shocks applied to the hydrogen circulation pump 64 or the gas-liquid separator 62 can be prevented, and moreover, the drainage efficiency in the hydrogen gas circulation flow path can be enhanced.

D2. Modification 2:

In the foregoing embodiment, the fuel cell stack 20, as well as auxiliary components such as the hydrogen supply unit 55, the gas-liquid separator 62 and the hydrogen circulation pump 64, are provided within the engine room of the vehicle. In contrast to this, as a modification of the foregoing embodiment, the fuel cell stack and the auxiliary components may be placed under the floor of the vehicle.

Figure 5:
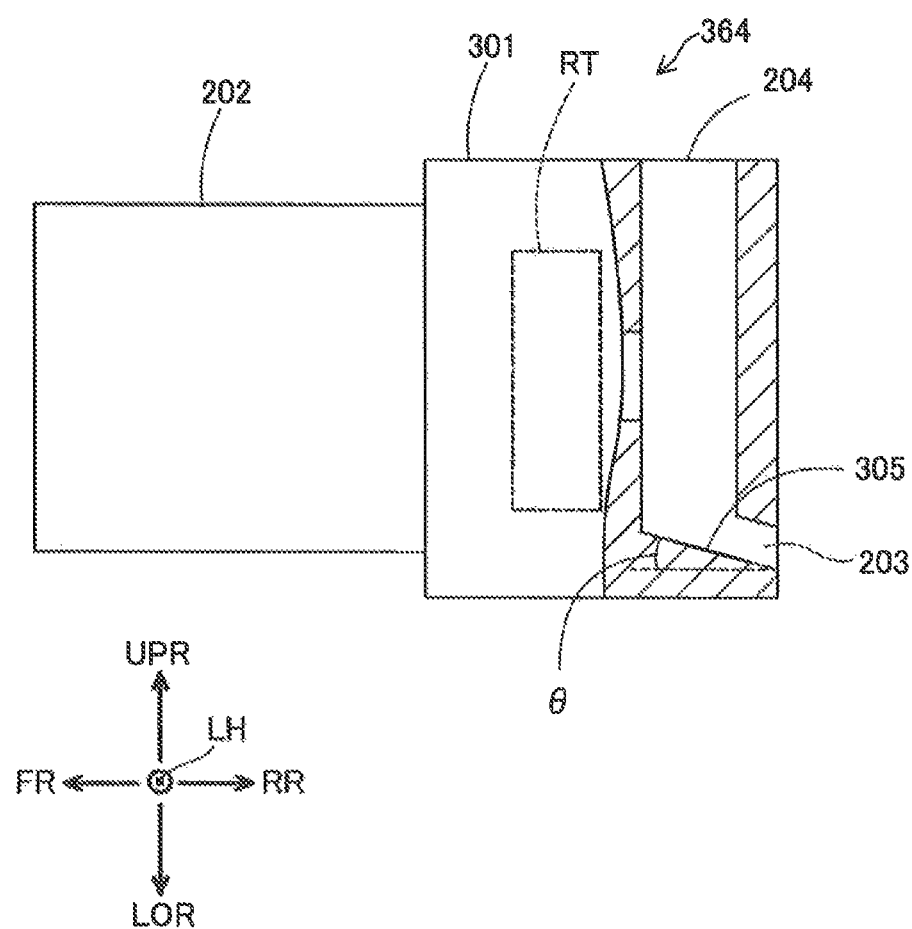
FIG. 5 is an explanatory view showing Modification 3.

D3. Modification 3:

In the foregoing embodiment, the hydrogen circulation pump 64 is placed so as to be inclined relative to the front/rear directions FR, RR of the vehicle, so that the communicating path 205 within the pump chamber 201 is inclined relative to the horizontal direction (see FIGS. 3 and 4). In contrast to this, as a modification of the foregoing embodiment, it is also allowable that, as shown in FIG. 5, with the vehicle placed on a horizontal plane, a hydrogen circulation pump 364 itself is placed parallel to the horizontal direction (direction of a plane formed by the front/rear directions FR, RR and the left/right directions LH, RH), while a communicating path 305 succeeding the intake port 203 provided in the pump chamber is inclined so that the front direction FR side is inclined upward by an angle θ relative to the front/rear directions FR, RR. Referring to FIG. 5, the same parts as in the foregoing embodiment are designated by the same reference signs and their description is omitted. According to this modification 3, as in the foregoing embodiment, accumulation of water within a pump chamber 301 can be suppressed.

D4. Modification 4:

As another modification of the foregoing embodiment, it is also allowable that, as shown in FIG. 6, when the vehicle is placed on a horizontal plane, a hydrogen circulation pump 464 itself is placed parallel to the horizontal direction (direction of a plane formed by the front rear directions FR, RR and the left/right directions LH, RH), while an intake port 403 provided in the pump chamber is opened to the lower direction LOR and an end face 405 succeeding the intake port 403 is tapered so as to be inclined by the specified angle θ relative to the horizontal direction. Referring to FIG. 6, the same parts as in the foregoing embodiment are designated by the same reference signs and their description is omitted. According to this modification 4, as in the foregoing embodiment and Modification 3, accumulation of water within a pump chamber 401 can be suppressed.

D5. Modification 5:

Although the fuel cell system 10 is mounted on a vehicle in the foregoing embodiment, the fuel cell system may instead be mounted on a mobile body other than vehicles, such as ships and airplanes. Further, the fuel cell system does not necessarily need to be mounted on a mobile object and may be installed at a fixed position. In this case, damage to the fuel cell stack can be prevented when an external force acts on the hydrogen circulation pump or the gas-liquid separator so that shocks are applied to the hydrogen circulation pump or the gas-liquid separator. In the case where the fuel cell system is installed at a fixed position, 'upper side,' 'lower side,' 'above,' and 'below' refer to directions extending along the vertical direction.

The present disclosure is not limited to the above-described embodiment and modifications and may be fulfilled in various configurations unless those configurations depart from the gist of the disclosure. For example, technical features in the embodiment and modifications may be replaced or combined with one another, as required, in order to solve part or the entirety of the above-described problems or to achieve part or the entirety of the above-described advantageous effects. Also, out of the component elements in the above-described embodiment and modifications, elements other than those described in the independent are additional elements and so omittable as required.

In one aspect of the present disclosure, there is provided a fuel cell system. The fuel cell system includes: a fuel cell stack having a stacked body in which a plurality of fuel cells are stacked in a stacking direction, a hydrogen gas inlet, a hydrogen gas outlet, an air inlet, and an air outlet; a hydrogen gas supply flow path configured to allow gas to circulate to the hydrogen gas inlet from a hydrogen gas supply unit which serves for supplying hydrogen gas; a hydrogen gas circulation flow path configured to allow gas to circulate from the hydrogen gas outlet to a merging point of the hydrogen gas supply flow path; a hydrogen circulation pump provided midway on the hydrogen gas circulation flow path to pressurize and feed hydrogen off-gas, which is discharged from the hydrogen gas outlet, toward the hydrogen gas supply flow path; and a gas-liquid separator provided midway on the hydrogen gas circulation flow path to separate water content from the hydrogen off-gas. The fuel cell stack has a configuration that as viewed along the stacking direction, the hydrogen gas inlet is positioned above the hydrogen gas outlet, and a direction of connection between the hydrogen gas inlet and the hydrogen gas outlet and a direction of connection between the air inlet and the air outlet intersect each other. An upper end of the hydrogen circulation pump is positioned on a lower side of a lower end of the fuel cell stack. A position where the gas-liquid separator is provided on the hydrogen gas circulation flow path is the lowest site of the hydrogen gas circulation flow path.

According to the fuel cell system in this aspect, since the position where the gas-liquid separator is provided on the hydrogen gas circulation flow path is the lowest site of the hydrogen gas circulation flow path, the gas-liquid separator is positioned below the hydrogen circulation pump. Therefore, the upper end of the hydrogen circulation pump and the upper end of the gas-liquid separator are both positioned below the fuel cell stack. Thus, a possibility that the hydrogen circulation pump or the gas-liquid separator may collide with the fuel cell stack when a shock is applied to the hydrogen circulation pump or the gas-liquid separator in a direction perpendicular to the up/down direction can be suppressed. Also, the gas-liquid separator is provided at the lowest site of the hydrogen gas circulation flow path. Therefore, water content contained in the hydrogen off-gas discharged through the hydrogen gas outlet of the fuel cell stack flows down to the gas-liquid separator, and does not accumulate in the hydrogen gas circulation flow path. Thus, according to the fuel cell system of this aspect, damage to the fuel cell stack upon a shock applied the hydrogen circulation pump or the gas-liquid separator can be prevented, and moreover, drainage efficiency in the hydrogen gas circulation flow path can be enhanced.

In the fuel cell system of the above-described aspect, the gas-liquid separator may include a water reservoir for separating liquid water content from the hydrogen off-gas and reserving water therein, and an upper end of the water reservoir may be positioned on a lower side of a connecting position of the gas-liquid separator with the hydrogen gas circulation flow path. According to the fuel cell system of this aspect, the water reservoir of the gas-liquid separator can securely be positioned below any position of the hydrogen gas circulation flow path. Therefore, drainage efficiency in the hydrogen gas circulation flow path can securely be enhanced.

In the fuel cell system of the above-described aspect, as viewed in a direction in which the hydrogen gas outlet and the air outlet are connected to each other, the hydrogen circulation pump and the gas-liquid separator may be placed at positions, respectively, closer to the air outlet than to the hydrogen gas outlet. According to the fuel cell system of this aspect, when liquid water content discharged from the gas-liquid separator is merged with the cathode off-gas piping coupled to the air outlet, piping ranging from the gas-liquid separator to the merging point can be shortened in length.

In the fuel cell system of the above-described aspect, the hydrogen gas inlet, the merging point, the hydrogen circulation pump, and the gas-liquid separator may be placed so as to be arrayed in an up/down direction. According to the fuel cell system of this aspect, since water sticking to piping between the hydrogen circulation pump and the gas-liquid separator falls vertically downward by gravity, a possibility that the hydrogen gas circulation flow path may be blocked by remaining water upon stopping of the fuel cell system can be suppressed.

In the fuel cell system of the above-described aspect, a portion of the hydrogen gas supply flow path on a downstream side of the merging point may be shorter than a portion of the hydrogen gas circulation flow path on a downstream side of the hydrogen circulation pump. According to the fuel cell system of this aspect, since the merging point of the hydrogen gas circulation flow path with the hydrogen gas supply flow path can be made closer to the hydrogen gas inlet, pressure loss and freezing blockage in the hydrogen gas circulation flow path can be suppressed.

In another aspect of the present disclosure, there is provided a vehicle. The vehicle includes the fuel cell system in accordance with the above-described aspects. According to the vehicle of this aspect, damage to the fuel cell stack upon a shock applied to the hydrogen circulation pump or the gas-liquid separator can be prevented, and moreover, drainage efficiency in the hydrogen gas circulation flow path can be enhanced.

The present disclosure may be implemented in various embodiments other than devices (systems) and vehicles. For example, the disclosure may also be implemented as a mobile body other than vehicles such as ships and airplanes on which a fuel cell system is mounted, and as a control method for a fuel cell system, a computer program for implementing the control method, a temporary recording medium on which the computer program has been recorded, and the like.

What is claimed is:

1. A fuel cell system provided in a vehicle, the fuel cell system comprising:
    a fuel cell stack including a stacked body in which a plurality of fuel cells are stacked in a stacking direction, a hydrogen gas inlet, a hydrogen gas outlet, an air inlet, and an air outlet;
    a hydrogen gas supply flow path configured to supply gas to the hydrogen gas inlet from a hydrogen gas supply unit which serves for supplying hydrogen gas;
    a hydrogen gas circulation flow path configured to supply gas from the hydrogen gas outlet to a merging point of the hydrogen gas circulation flow path with the hydrogen gas supply flow path;
    a hydrogen circulation pump provided midway on the hydrogen gas circulation flow path and configured to pressurise and feed hydrogen off-gas which is discharged from the hydrogen gas outlet, toward the hydrogen gas supply flow path; and
    a gas-liquid separator provided midway on the hydrogen gas circulation flow path and configured to separate liquid water content from the hydrogen off-gas flowing to the hydrogen circulation pump, wherein
    the fuel cell stack has a configuration that as viewed along the stacking direction,
        the hydrogen gas inlet is positioned above the hydrogen gas outlet, relative to a vertical direction of the vehicle,
        the air inlet is positioned above the air outlet, relative to the vertical direction of the vehicle, and
        a direction of connection between the hydrogen gas inlet and the hydrogen gas outlet and a direction of connection between the air inlet and the air outlet intersect each other, and wherein
    an upper end of the hydrogen circulation pump is positioned below a lower end of the fuel cell stack, relative to the vertical direction of the vehicle, and
    a position where the gas-liquid separator is provided on the hydrogen gas circulation flow path is a lowest site of the hydrogen gas circulation flow path along the vertical direction of the vehicle.

2. The fuel cell system in accordance with claim 1, wherein
    the gas-liquid separator includes a water reservoir configured to separate water content from the hydrogen off-gas and to reserve water therein, and
    an upper end of the water reservoir is positioned below a connecting position of the gas-liquid separator with the hydrogen gas circulation flow path, relative to the vertical direction of the vehicle.

3. The fuel cell system in accordance with claim 1, wherein
    as viewed in a direction in which the hydrogen gas outlet and the air outlet are connected to each other, the hydrogen circulation pump and the gas-liquid separator are placed at positions, respectively, both closer to the air outlet than to the hydrogen gas outlet.

4. The fuel cell system in accordance with claim 1, wherein
    the hydrogen gas inlet, the merging point, the hydrogen circulation pump, and the gas-liquid separator are placed so as to be arrayed along an axis parallel with the vertical direction of the vehicle.

5. The fuel cell system in accordance with claim 1, wherein
    a portion of the hydrogen gas supply flow path on a downstream side of the merging point is shorter than a portion of the hydrogen gas circulation flow path on a downstream side of the hydrogen circulation pump.

6. A vehicle including the fuel cell system in accordance with claim 1.

7. The fuel cell system in accordance with claim 1, wherein
    an upper end of the gas-liquid separator is positioned below a lower end of the hydrogen circulation pump, relative to the vertical direction of the vehicle.

* * * * *